US008067065B2

(12) United States Patent
McCarthy et al.

(10) Patent No.: US 8,067,065 B2
(45) Date of Patent: Nov. 29, 2011

(54) FIBRILLAR, NANOTEXTURED COATING AND METHOD FOR ITS MANUFACTURE

(75) Inventors: Thomas J. McCarthy, Amherst, MA (US); Lichao Gao, Amherst, MA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 990 days.

(21) Appl. No.: 11/481,270

(22) Filed: Jul. 5, 2006

(65) Prior Publication Data
US 2007/0135007 A1    Jun. 14, 2007

Related U.S. Application Data

(60) Provisional application No. 60/748,474, filed on Dec. 8, 2005.

(51) Int. Cl.
   B05D 5/02 (2006.01)
(52) U.S. Cl. ........ 427/340; 427/533; 427/535; 427/536; 427/539; 427/569; 427/578; 427/387; 427/407.1; 427/419.1; 427/419.8
(58) Field of Classification Search .................. None
   See application file for complete search history.

(56) References Cited

U.S. PATENT DOCUMENTS

| | | | |
|---|---|---|---|
| 2,306,222 A | 12/1942 | Patnode | |
| 6,287,639 B1 | 9/2001 | Schmidt et al. | |
| 6,649,266 B1 | 11/2003 | Gross et al. | |
| 6,743,467 B1 | 6/2004 | Jones et al. | |
| 6,800,354 B2 | 10/2004 | Baumann et al. | |
| 6,919,106 B2 * | 7/2005 | Murakami et al. | 427/535 |
| 7,022,416 B2 * | 4/2006 | Teranishi | 428/601 |
| 2003/0186066 A1 | 10/2003 | Monkiewicz et al. | |
| 2006/0004169 A1 * | 1/2006 | Sherwood et al. | 528/10 |
| 2006/0014012 A1 * | 1/2006 | Thies et al. | 428/323 |
| 2006/0019114 A1 * | 1/2006 | Thies et al. | 428/522 |
| 2006/0068107 A1 * | 3/2006 | Madou et al. | 427/249.1 |
| 2006/0246277 A1 * | 11/2006 | Axtell et al. | 428/331 |
| 2006/0275595 A1 * | 12/2006 | Thies et al. | 428/312.2 |

FOREIGN PATENT DOCUMENTS

| | | |
|---|---|---|
| JP | 2005-302631 | 10/2005 |
| WO | WO2004/113456 | * 12/2004 |
| WO | WO 2005/068399 | 7/2005 |

* cited by examiner

*Primary Examiner* — Erma Cameron
(74) *Attorney, Agent, or Firm* — Gifford, Krass, Sprinkle, Anderson & Citkowski, P.C.

(57) ABSTRACT

A fibrillar, nanotextured coating is deposited on a substrate by contacting the substrate with a reaction mixture comprising a reagent which is hydrolyzable to produced a cross-linked reaction product, and a first solvent which solvates the reagent and the reaction product. The reagent is hydrolyzed so as to provide a cross-linked reaction product which is bonded to the substrate. The substrate is then contacted with a second solvent which is a non-solvent for the reaction product so as to cause nanoscopic phase separation of the reaction product, resulting in the formation of a fibrillar nanotextured coating which is bonded to the substrate. The thus produced coating may be subjected to further chemical modification. The method may be utilized to produce superhydrophobic coatings. Also disclosed are coatings made by the method of the present invention.

16 Claims, 2 Drawing Sheets

FIBRILLAR, NANOTEXTURED COATING AND METHOD FOR ITS MANUFACTURE

RELATED APPLICATION

This application claims priority of U.S. Provisional Patent Application Ser. No. 60/748,474 filed Dec. 8, 2005, entitled "First Perfectly Hydrophobic Surface" and is herein incorporated by reference in its entirety.

FIELD OF THE INVENTION

This invention relates generally to coatings. More specifically, the invention relates to a fibrillar, nanotextured coating and to methods for its manufacture.

BACKGROUND OF THE INVENTION

The nanotexture of a surface can influence various properties of that surface such as its wettability by water and oils, its optical properties, and its chemical reactivity. Consequently, the art has sought methods and materials for controlling the nanotextures of various materials. Chemical methods such as etching processes, and physical methods such as sandblasting and other erosion processes have been utilized with success to control the microtexture of various materials. However, such methods have generally been inadequate for providing nanotextured surfaces.

The prior art, as exemplified by U.S. Pat. No. 2,306,222, has recognized that particular silane materials may be utilized to deposit a water-repellant coating onto various substrates. The coating deposited by the use of this technology is a relatively smooth coating, and various approaches have been implemented to texturize this coating so as to increase its water repellency. For example, U.S. Pat. No. 6,649,266 shows the deposition of silane coatings onto microtextured substrates to provide coatings having enhanced hydrophobicity. Another approach is described in PCT Published Application WO 2005/068399. This publication describes the use of a sol/gel chemical process for depositing a sponge-like water-repellant coating having a nanoscale roughness. Use of this technology to deposit a coating onto a surface having an additional microscale texture has been found to provide a coating with further enhanced hydrophobicity.

Despite various efforts the prior art has not been able to prepare a synthetic surface which is perfectly hydrophobic. As will be explained hereinbelow, the hydrophobic nature of a surface may be quantified by the contact angle that surface forms with a droplet of water. A perfectly hydrophobic surface has a contact angle of 180 degrees, and within the context of this disclosure, surfaces having contact angles in excess of 170 degrees are referred to as superhydrophobic. As will be further explained hereinbelow, the present invention, in one embodiment, provides for a nanotextured surface having a fibrillar coating of a water-repellant material. The fibrillar, nanotextured nature of the coating of the present invention causes the surface to be superhydrophobic.

As mentioned above, the nanotexture of surfaces can influence properties other than, or in addition to, their wettability by water. As will be further explained hereinbelow, the present invention, in other aspects, may be utilized to prepare coated surfaces which are strongly hydrophilic and/or oleophobic, or oleophilic. Also, the present invention may be utilized to prepare surfaces having controlled optical properties such as reflectivity and absorption. In further aspects of the present invention, chemical reactivity of the surfaces may be controlled by utilizing the fibrillar, nanotextured materials of the present invention. All of these embodiments and advantages of the invention will be apparent from the drawings, discussion and description which follow.

BRIEF DESCRIPTION OF THE INVENTION

Disclosed is a method for providing a fibrillar, nanotextured coating on a substrate. In that regard, the substrate is coated with a reaction mixture which comprises a reagent having at least two reactive sites thereupon. The reagent is hydrolyzable so as to provide a cross-linked reaction product. The reaction mixture further includes a first solvent which solvates the reagent and swells the reaction product. At least a portion of the reagent in the reaction mixture is hydrolyzed so as to provide a cross-linked reaction product which is bonded to the substrate. A second solvent is mixed into the reaction mixture after the step of hydrolyzing the reagent. The second solvent is miscible with the first solvent and is a non-solvent for the reaction product. This step causes the cross-linked reaction product to phase separate from the reaction mixture as a fibrillar, nanotextured coating which is bonded to the substrate.

In specific embodiments, the reagent is a silane material such as a material of the formula:

$$R_n SiX_{4-n}$$

wherein n is in the range of 0-3; R is independently, one or more of H or alkyl; and X is independently, one or more of a halogen or a halogen-like species such as $OSO_2$—$CF_3$. Specific reagents of this type include $CH_3$—Si—$Cl_3$, $(CH_3)_2$—$SiCl_2$, $(CH_3)_3$—SiCl and $SiCl_4$, used singly or in various combinations. In specific instances, the first solvent is an aromatic solvent such as benzene, toluene, or xylenes, and the second solvent is an alcohol.

In a further embodiment of the invention, the mixture of the first and second solvents is removed from the coated substrate, and this may be accomplished through the use of a third solvent which is miscible with the second solvent and is a non-solvent for the coating. In some instances, the third solvent is water.

In a further aspect of the invention, the fibrillar, nanotextured coating prepared in accord with the foregoing is reacted with a first conversion reagent which chemically alters at least a portion of the coating. In some instances, this reagent may be an oxidizer such as an oxygen plasma, which converts the coating to a silica coating. Such silica coatings are typically very hydrophilic. The thus-reacted coatings may be further reacted with a second and subsequent conversion reagent to further control their properties. For example, the silica-based coating produced by oxidation can be reacted with appropriate fluoroalkyl materials to prepare a surface which is highly oleophobic.

Also disclosed herein are coatings prepared by the methods of the present invention, including superhydrophobic coatings.

DETAILED DESCRIPTION OF THE INVENTION

Figure 1:
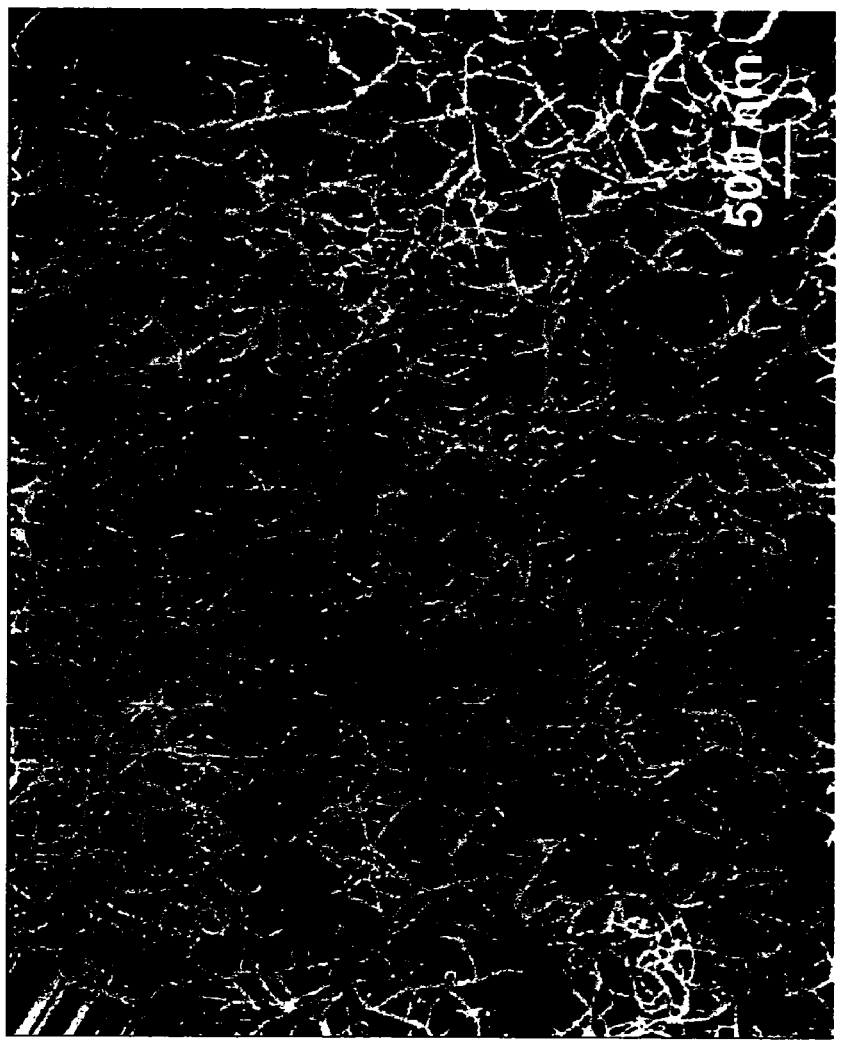
FIG. 1 is a scanning electron micrograph of a coating of the present invention.

This invention is directed generally to nanotextured surfaces having a fibrillar structure. Within the context of this disclosure, a nanotextured surface is understood to be a surface having features in the nanoscale range, typically a range of 5 nanometers to 1 micron. A fibrillar structure is understood to be a structure characterized by the presence of a plurality of fibrous features, said fibers having a columnar structure wherein the length of the column is greater than its diameter. The fibrillar structure may comprise a felted mat, separated fibers having one end thereof anchored to the surface, or a mixture of such textures. As discussed above, the nanotextured nature of the surface enhances or otherwise modifies the physical and chemical properties of the material comprising the coating. These properties can include, among other things, chemical reactivity, wettability by oils or water, and optical properties such as reflectivity and light absorption.

In the process of the present invention, a reagent is cross linked proximate a substrate which is to be coated so as to form a cross-linked network. This reaction is carried out in a solvent which, in addition to solvating precursor materials, solvates and hence swells the cross-linked structure which is anchored to the substrate. In a subsequent step of the invention, the initial solvent material is replaced with a second solvent which is a non-solvent for the cross-linked material. The second solvent is typically miscible with the first solvent, and this extraction process is carried out by adding the second solvent to the initial reaction mixture to induce phase separation. Given that the cross-linked network is anchored to the substrate, this phase separation produces the nanotextured fibrillar structure which characterizes the present invention. This second solvent may subsequently be extracted by the use of a third solvent.

The thus produced nanotextured, fibrillar coating may be used in an as-is form, or it may be further reacted so as to modify its surface properties. The thus modified coating may be further reacted so as to selectably control its surface properties.

The methodology of the present invention allows for the rapid and reliable production of nanoscale coatings on a wide variety of surfaces including metals, ceramics, glasses, polymers, textiles, paper stocks, mineral materials, as well as on natural surfaces such as wood, leather, and the like.

In one particular group of embodiments of the present invention, the nanotextured coatings are based upon silicon containing reactive species such as silanes typically include a number of readily reactable sites thereupon, which allow them to readily bond to a number of substrate materials and react so as to crosslink to other silane molecules. One particular class of silane materials which may be used in the present invention are of the general formula:

$$R_n SiX_{4-n}$$

wherein n is in the range of 0-3; R is independently, one or more of hydrogen or an organic group such as an alkyl (including substituted alkyls); and X is independently, one or more of a halogen or a halogen-like species such as $OSO_2$—$CF_3$.

Chlorosilanes are one specific group of materials which may be used in the present invention, and organochlorosilanes such as methylchlorosilanes are some specific members of this group. These materials may be used either singly or in combination, and it will be apparent to one of skill in the art that the properties of the cross-linked network formed by the hydrolysis of these materials may be controlled by controlling the ratio of different materials in a reaction mixture. $SiCl_4$ may be added to the reaction mixture to enhance cross linking or otherwise control the properties of the hydrolyzed product.

In the process of the present invention, the hydrolyzable compounds such as the silane are dissolved in a material which is a good solvent for the reacting chemicals, which solvent also solvates and swells the resultant cross-linked network. Typical solvents include aromatic materials such as benzene, toluene, and various xylenes. The substrate is contacted with a reaction mixture comprising the hydrolyzable reagent and solvent, and the reagent is hydrolyzed, typically by including a small amount of a hydrolyzing agent such as water in the reaction mixture. This causes the formation of the cross-linked network which network is anchored to the substrate. Reaction conditions will depend upon the specific nature of the reagents and the degree of cross linking, and hence the ultimate structure of the nanotextured coating, which is desired. However, in some typical embodiments, the reaction mixture is approximately 0.1-2.0 molar with regard to the hydrolyzable reagent; although, the reaction mixture may be 5 or more molar with regard to the reagent.

Following the step of hydrolysis, the first solvent is extracted from the reaction mixture and replaced with a second solvent which is a non-solvent for the cross-linked reaction product. This extraction is typically carried out by mixing the second solvent into the reaction mixture following the step of hydrolysis. Typically, the solvent mixture is then removed, and the coated substrate washed with at least one more portion of the second solvent. In some instances, the second solvent is then removed by washing with a third solvent. In one typical group of embodiments, the second solvent is an alcohol such as ethanol or isopropanol. The third solvent, in such instances, if employed, may comprise water. In some instances the majority of the reactive silane solution is removed from the reaction flask before extraction with the second solvent, and in some instances the sample is rinsed with the first solvent before being extracted with the second solvent.

The thus described process produces a nanotextured fibrillar coating of a silicon-based fibrous material on the surface of the substrate. This coating is highly hydroscopic and, as will be explained hereinbelow, exhibits advancing and receding contact angles for water of more than 170 degrees, and in some instances, more than 175 degrees. In particular instances, both the advancing and receding contact angles for water are 180 degrees making the surface perfectly hydrophobic. Coatings of the present invention are thus characterized as superhydrophobic.

Figure 2:
FIG. 2 is an enlarged view of the coating of FIG. 1.

FIG. 1 is a scanning electron micrograph of a coating prepared in accord with the foregoing procedure. As will be seen, the coating is a highly fibrillar structure, comprised of a plurality of filaments, each having a length significantly exceeding its diameter. These filaments are anchored to the underlying substrate; and in some instances they may be cross linked to one another, as is best seen in FIG. 2, which is an enlarged view of the coating of FIG. 1. The filaments form a nanofeatured network. As such, the coatings of the present invention are differentiated from hydrophobic coatings of the prior art, and this difference is manifest by the fact that coatings of the present invention are superhydrophobic.

The properties of the coatings of the present invention may be further modified by chemical reaction. For example, the coating may be reacted with additional silane materials. The coating may also be reacted with oxidizing agents such as an oxygen plasma; and this reaction will convert at least a portion of the coating to silica which will cause the coating to be hydrophilic. Such an oxidation reaction may be carried out either prior to or subsequent to further couplings with silanes. In some instances, the thus reacted surface may be further reacted with species such as a fluorosilane to render them oleophobic. In yet other instances, the nanotextured surface may be reacted with dyes, fluorescent reagents, organometallic compounds, or other reagents so as to modify their surface properties. In view of the teaching presented herein, yet other such surface modifications will be apparent to those of skill in the art.

The present invention will be described with reference to one particular process for preparing an ultrahydrophobic surface on a silicon wafer. In the process, silicon wafers were submerged in a 1.0 M solution of $CH_3SiCl_3$ in toluene at room temperature for three hours. The hydrolysis reaction was carried out in vessels which were closed to the air during the reaction time, but exposed to relative humidity of approximately 40-65% during solution and sample introduction, and this residual water was active to hydrolyze the silane compound. Thereafter, the wafers were rinsed with a further portion of toluene, rinsed with ethanol, rinsed with an ethanol-water mixture and subsequently rinsed with water. The substrates were then dried at 120° C.

Surfaces coated by the foregoing method are highly hydrophobic. Water droplets do not come to rest on the surfaces. Contact angle as measured with regard to a receding water droplet ($\theta_R$) is 180 degrees. The droplet can be "pushed onto" the surface and the finite advancing contact angle ($\theta_A$) is in the range of 175-178 degrees.

Given the highly hydrophobic nature of these surfaces, a new method for measuring hydrophobicity was devised. In this method, surfaces to be examined were lowered onto a supported water droplet and repetitive contact, compression and release of the droplet were recorded by video. Surfaces having contact angles of less than 180 degrees exhibit some affinity for the droplet during attachment and release; however, truly hydrophobic surfaces will have a contact angle of 180 degrees and exhibit no affinity.

Coated surfaces prepared by the foregoing method are indistinguishable by eye from unmodified wafers, and in that regard contain no micron scale topography. Scanning electron micrography indicates that the coating is comprised of a network of cylindrical fibers having diameters of approximately 40 nm. The method of the present invention promotes vertical polymerization of the silane onto a covalently attached toluene-swollen three-dimensional methylsiloxane network. Phase separation occurs during the ethanol rinse. In an experimental series comprising 100 repetitions of the foregoing procedure, extremely hydrophobic surfaces are always formed. Perfectly hydrophobic surfaces ($\theta_A/\theta_R$=180 degrees/180 degrees) are formed in approximately 70% of the cases.

As discussed above, other silane compounds, including blends of silane compounds, may also be used in a similar manner. While the foregoing example employs chlorosilanes, good reactivity has also been found utilizing iodosilanes as well as silanes based upon methyltrifluorosulfonate.

Surfaces prepared according to the foregoing may be further modified. For example, exposure of the foregoing superhydrophobic surfaces to an oxidizing reagent such as an oxygen plasma converts at least some of the methylsilicone moieties to silica without a loss of nanoscopic morphology. The coatings thus modified are spontaneously wetted by water. The silica surfaces thus produced may be still further modified. For example, treatment of the silica surfaces with fluoroalkyl silanes produces oleophobic surfaces that are not wet by hydrocarbon liquids.

In one group of surface modification reactions, samples of the nanotextured coating were treated with an oxygen plasma, as described above, and the samples were introduced into a reaction flask and treated with a toluene solution (0.1-2.0 molar) of a variety of silanes for one hour. Alternatively, the samples could be exposed to reactive silanes in the vapor phase. The silanes used were of the type $RSiX_3$, $R_2SiX_2$ and $R_3SiX$ where R is one or more of alkyl, aryl, fluoro alkyl or amino alkyl, and X is one or more of Cl, $N(R)_2$ or $OSO_2CF_3$. The samples were isolated and rinsed (in this order) with 2×10 ml of toluene, 3×10 ml of ethanol, 2×10 ml of ethanol-water (1:1), 2×10 ml of water, and then dried in a clean oven at 120° C. for 10 minutes. Silanes wherein R=$CH_2$—$CH_2$—$C_6F_{13}$ and $CH_2$—$CH_2$—$C_8F_{17}$ were found to render surfaces that were perfectly hydrophobic (advancing and receding contact angles of 180 degrees) and also repellant to hydrocarbon liquids (oleophobic).

The present invention provides methods and materials for disposing a fibrillar, nanotextured coating onto a variety of substrate surfaces. The properties of the coating may be tailored to affect its wettability by water, hydrocarbons and other materials. Likewise, the optical properties of the surface may be readily controlled, as for example with regard to reflectivity, light absorption, fluorescence and the like. In view of the teaching presented herein, numerous modifications and variations of the invention will be readily apparent to those of skill in the art. The foregoing drawings, discussion and description are illustrative of specific embodiments of the invention, but are not meant to be limitations upon the practice thereof. It is the following claims, including all equivalents, which define the scope of the invention.

The invention claimed is:

1. A method for providing a fibrillar, nanotextured coating on a substrate, said method comprising:
contacting said substrate with a reaction mixture comprising a reagent having the formula:

wherein n is in the range of 0-3; R is independently H or alkyl; and X is independently halogen or $OSO_2$—$CF_3$, said reagent being hydrolyzable so as to provide a cross-linked reaction product, said reaction mixture further including a first solvent which solvates said reagent and swells said reaction product;
hydrolyzing at least a portion of said reagent in said reaction mixture so as to provide a cross-linked reaction product which is bonded to said substrate;
mixing a second solvent into the reaction mixture after hydrolyzing, said second solvent being miscible with said first solvent, and comprising a non-solvent for said reaction product; whereby said second solvent causes said cross-linked reaction product to phase separate from said reaction mixture as a fibrillar, nanotextured coating which is bonded to said substrate.

2. The method of claim 1, wherein said reagent comprises at least one of: $CH_3$—Si—$Cl_3$, $(CH_3)_2$—Si—$Cl_2$, $(CH_3)_3$—Si—Cl, and $SiCl_4$.

3. The method of claim 1, wherein said reagent consists essentially of $CH_3$—Si—$Cl_3$.

4. The method of claim 1, wherein said first solvent is selected from a group consisting of: benzene, toluene, xylenes, and combinations thereat and said second solvent is an alcohol.

5. The method of claim 1, including the further step of separating the reaction mixture from reaction product prior to contacting the substrate with said second solvent.

6. The method of claim 1, including the further step of removing said first solvent and said second solvent from said substrate following mixing the second solvent into the reaction mixture.

7. The method of claim 6, including the further step of washing said substrate with a third solvent, after said first and second solvents have been separated therefrom, said third solvent being miscible with said second solvent, and being a non-solvent for said reaction product.

8. The method of claim 7, wherein said third solvent comprises water.

9. The method of claim 1, wherein said reaction mixture is in the range of 0.1-5.0 molar with regard to said reagent.

10. The method of claim 1, wherein said reaction mixture is 1.0 molar with regard to said reagent.

11. The method of claim 1, including the further step of reacting said fibrillar, nanotextured coating, following phase separation from said reaction mixture and bonding to said substrate with a first conversion reagent which chemically alters at least a portion of said coating.

12. The method of claim 11, wherein said first conversion reagent comprises an oxidizer.

13. The method of claim 11, wherein said oxidizer comprises an oxygen plasma.

14. The method of claim 11, wherein said first conversion reagent is an organometallic compound.

15. The method of claim 11, including the step of reacting said chemically altered coating with a second conversion reagent.

16. The method of claim 15, wherein said second conversion reagent is a fluorosilane which chemically alters the coating so as to render it oleophobic.

* * * * *